United States Patent
Kaluskar et al.

(10) Patent No.: US 9,176,772 B2
(45) Date of Patent: Nov. 3, 2015

(54) SUSPENDING AND RESUMING OF SESSIONS (75) Inventors: Sanjay Kaluskar, Menlo Park, CA (US); Sreenivas Gollapudi, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1423 days.

(21) Appl. No.: 11/057,043

(22) Filed: Feb. 11, 2005

(65) Prior Publication Data

US 2006/0184535 A1    Aug. 17, 2006

(51) Int. Cl.
 G06F 17/30    (2006.01)
 G06F 9/48     (2006.01)

(52) U.S. Cl.
 CPC ........ *G06F 9/4856* (2013.01); *G06F 17/30289* (2013.01)

(58) Field of Classification Search
 None
 See application file for complete search history.

(56) References Cited

U.S. PATENT DOCUMENTS

| | | |
|---|---|---|
| 3,444,528 A | 5/1969 | Lovell et al. |
| 4,586,134 A | 4/1986 | Norstedt |
| 4,868,832 A | 9/1989 | Marrington et al. |
| 5,047,922 A | 9/1991 | Borkar |
| 5,157,663 A | 10/1992 | Major et al. |
| 5,179,660 A | 1/1993 | Devany et al. |
| 5,247,664 A | 9/1993 | Thompson et al. |
| 5,247,671 A | 9/1993 | Adkins et al. |
| 5,289,461 A | 2/1994 | de Nijs |
| 5,319,754 A | 6/1994 | Meinecke et al. |
| 5,392,285 A | 2/1995 | Kurts |
| 5,448,559 A | 9/1995 | Hayter et al. |
| 5,530,905 A | 6/1996 | Nichols et al. |
| 5,535,326 A | 7/1996 | Baskey et al. |
| 5,544,313 A | 8/1996 | Shachnai et al. |
| 5,553,242 A | 9/1996 | Russell et al. |
| 5,566,225 A | 10/1996 | Haas |
| 5,566,297 A | 10/1996 | Devarakonda et al. |
| 5,596,720 A | 1/1997 | Hamada et al. |
| 5,596,745 A | 1/1997 | Lai et al. |
| 5,598,536 A | 1/1997 | Slaughter, III et al. |
| 5,600,722 A | 2/1997 | Yamaguchi et al. |

(Continued)

FOREIGN PATENT DOCUMENTS

| EP | 0 942 363 A2 | 9/1999 |
|---|---|---|
| EP | 0942363 | 9/1999 |

(Continued)

OTHER PUBLICATIONS 1996 definition of "server" available at: http://web.archive.org/web/20010411032957/http://www.webopedia.com/TERM/s/server.html.*

(Continued)

*Primary Examiner* — Belix M Ortiz Ditren
(74) *Attorney, Agent, or Firm* — Hickman Palermo Becker Bingham LLP (57) ABSTRACT

A session established for an application is suspended from an instance and later resumed on the server or a different server. When a session is suspended, its state is captured and persistently stored as a session image in a data repository, and the session is terminated. When the session is resumed, a new session is established on an instance, the session image of the session to resume is retrieved from the repository and restored to the newly established session. The suspension and resumption of a session may be initiated by an application, which may request the suspension and resumption of a session.

32 Claims, 6 Drawing Sheets

MUTLI-TIER ARCHITECTURE 10

(56) References Cited

U.S. PATENT DOCUMENTS

| | | |
|---|---|---|
| 5,617,540 A | 4/1997 | Civanlar et al. |
| 5,633,861 A | 5/1997 | Hanson et al. |
| 5,633,999 A | 5/1997 | Clowes et al. |
| 5,642,515 A | 6/1997 | Jones et al. |
| 5,652,908 A | 7/1997 | Douglas et al. |
| 5,666,479 A | 9/1997 | Kashimoto et al. |
| 5,682,534 A | 10/1997 | Kapoor et al. |
| 5,684,800 A | 11/1997 | Dobbins et al. |
| 5,696,895 A | 12/1997 | Hemphill et al. |
| 5,721,918 A | 2/1998 | Nilsson et al. |
| 5,734,659 A | 3/1998 | Mann et al. |
| 5,734,896 A | 3/1998 | Rizvi et al. |
| 5,740,175 A | 4/1998 | Wakeman et al. |
| 5,758,345 A | 5/1998 | Wang |
| 5,761,507 A | 6/1998 | Govett |
| 5,771,349 A | 6/1998 | Picazo, Jr. et al. |
| 5,774,660 A | 6/1998 | Brendel et al. |
| 5,774,668 A | 6/1998 | Choquier et al. |
| 5,784,630 A | 7/1998 | Saito et al. |
| 5,790,800 A | 8/1998 | Gauvin et al. |
| 5,796,934 A | 8/1998 | Bhanot et al. |
| 5,796,941 A | 8/1998 | Lita |
| 5,796,999 A | 8/1998 | Azagury et al. |
| 5,805,816 A | 9/1998 | Picazo, Jr. et al. |
| 5,805,827 A | 9/1998 | Chau et al. |
| 5,805,920 A | 9/1998 | Sprenkle et al. |
| 5,819,019 A | 10/1998 | Nelson |
| 5,819,298 A | 10/1998 | Wong et al. |
| 5,828,879 A | 10/1998 | Bennett |
| 5,832,483 A | 11/1998 | Barker |
| 5,850,507 A | 12/1998 | Ngai et al. |
| 5,862,362 A | 1/1999 | Somasegar et al. |
| 5,867,713 A | 2/1999 | Shrader et al. |
| 5,870,545 A | 2/1999 | Davis et al. |
| 5,870,746 A | 2/1999 | Knutson et al. |
| 5,890,167 A | 3/1999 | Bridge, Jr. et al. |
| 5,890,169 A | 3/1999 | Wong et al. |
| 5,890,963 A | 4/1999 | Yen |
| 5,918,059 A | 6/1999 | Tavallaei et al. |
| 5,944,823 A | 8/1999 | Jade et al. |
| 5,951,694 A | 9/1999 | Choquier et al. |
| 5,963,556 A | 10/1999 | Varghese et al. |
| 5,974,463 A | 10/1999 | Warrier et al. |
| 5,978,849 A | 11/1999 | Khanna |
| 5,987,430 A | 11/1999 | Van Horne et al. |
| 6,006,264 A | 12/1999 | Colby et al. |
| 6,035,412 A | 3/2000 | Tamer et al. |
| 6,038,214 A | 3/2000 | Shionozaki |
| 6,038,677 A | 3/2000 | Lawlor et al. |
| 6,041,357 A | 3/2000 | Kunzelman et al. |
| 6,047,323 A | 4/2000 | Krause |
| 6,088,728 A | 7/2000 | Bellemore et al. |
| 6,173,413 B1 * | 1/2001 | Slaughter et al. ............ 714/6.32 |
| 6,178,529 B1 | 1/2001 | Short et al. |
| 6,182,139 B1 | 1/2001 | Brendel |
| 6,243,751 B1 | 6/2001 | Chatterjee et al. |
| 6,272,503 B1 | 8/2001 | Bridge et al. |
| 6,327,622 B1 | 12/2001 | Jindal et al. |
| 6,347,313 B1 * | 2/2002 | Ma et al. ............................ 707/3 |
| 6,442,568 B1 | 8/2002 | Velasco et al. |
| 6,505,200 B1 * | 1/2003 | Ims et al. ...................... 707/638 |
| 6,556,659 B1 | 4/2003 | Bowman-Amuah |
| 6,587,866 B1 | 7/2003 | Modi et al. |
| 6,601,101 B1 | 7/2003 | Lee et al. |
| 6,604,110 B1 | 8/2003 | Savage et al. |
| 6,667,751 B1 * | 12/2003 | Wynn et al. .................... 715/833 |
| 6,691,155 B2 | 2/2004 | Gottfried |
| 6,728,748 B1 | 4/2004 | Mangipudi et al. |
| 6,816,907 B1 | 11/2004 | Mei et al. |
| 6,874,031 B2 * | 3/2005 | Corbeil .......... 709/229 |
| 6,880,156 B1 | 4/2005 | Landherr et al. |
| 6,925,477 B1 | 8/2005 | Champagne et al. |
| 7,024,394 B1 * | 4/2006 | Ashour et al. .................. 705/64 |
| 7,058,957 B1 | 6/2006 | Nguyen |
| 7,107,294 B2 * | 9/2006 | Romanufa et al. ............ 707/202 |
| 7,174,379 B2 | 2/2007 | Agarwal et al. |
| 7,178,050 B2 | 2/2007 | Fung et al. |
| 7,181,492 B2 | 2/2007 | Wen et al. |
| 7,263,590 B1 | 8/2007 | Todd et al. |
| 7,269,157 B2 | 9/2007 | Klinker et al. |
| 7,277,945 B1 * | 10/2007 | Shah et al. .................... 709/226 |
| 7,552,171 B2 | 6/2009 | Chidambaran et al. |
| 2001/0047270 A1 | 11/2001 | Gusick et al. |
| 2001/0056493 A1 | 12/2001 | Mineo |
| 2002/0073139 A1 | 6/2002 | Hawkins et al. |
| 2002/0129157 A1 | 9/2002 | Varsano |
| 2002/0161896 A1 | 10/2002 | Wen et al. |
| 2002/0194015 A1 | 12/2002 | Gordon et al. |
| 2003/0007497 A1 | 1/2003 | March et al. |
| 2003/0014480 A1 | 1/2003 | Pullara et al. |
| 2003/0063122 A1 * | 4/2003 | Cichowlas et al. ........... 345/760 |
| 2003/0088671 A1 | 5/2003 | Klinker et al. |
| 2003/0108052 A1 | 6/2003 | Inoue et al. |
| 2003/0135642 A1 | 7/2003 | Benedetto et al. |
| 2003/0208523 A1 | 11/2003 | Gopalan et al. |
| 2003/0217159 A1 * | 11/2003 | Schramm-Apple et al. .. 709/228 |
| 2003/0236834 A1 | 12/2003 | Gottfried |
| 2004/0015600 A1 | 1/2004 | Tiwary et al. |
| 2004/0078602 A1 | 4/2004 | Rothbarth et al. |
| 2004/0111506 A1 | 6/2004 | Kundu et al. |
| 2004/0117794 A1 | 6/2004 | Kundu |
| 2004/0176996 A1 | 9/2004 | Powers et al. |
| 2004/0268357 A1 | 12/2004 | Joy et al. |
| 2005/0021771 A1 | 1/2005 | Kaehn et al. |
| 2005/0050116 A1 | 3/2005 | Gross et al. |
| 2005/0055446 A1 | 3/2005 | Chidambaran et al. |
| 2005/0066037 A1 * | 3/2005 | Song et al. .................... 709/227 |
| 2005/0131966 A1 * | 6/2005 | Lou .............................. 707/204 |
| 2005/0132222 A1 * | 6/2005 | Petrovic ....................... 713/201 |
| 2005/0165925 A1 | 7/2005 | Dan et al. |
| 2005/0239476 A1 | 10/2005 | Betrabet et al. |
| 2005/0267965 A1 | 12/2005 | Heller |
| 2006/0036617 A1 | 2/2006 | Bastawala et al. |
| 2007/0226323 A1 | 9/2007 | Halpern |
| 2013/0232113 A1 | 9/2013 | Chao Liang |

FOREIGN PATENT DOCUMENTS

| | | |
|---|---|---|
| EP | 0 992 909 A2 | 4/2000 |
| EP | 1 170 662 A2 | 1/2002 |
| JP | 08-077118 A | 3/1996 |
| JP | 1997-050412 | 2/1997 |
| JP | 09-231143 | 9/1997 |
| JP | 09-269903 A | 10/1997 |
| JP | 2002-091937 | 3/2002 |
| JP | 2002-150000 | 5/2002 |
| JP | 2002-091937 | 11/2002 |
| JP | 2002-342078 | 11/2002 |
| WO | WO 02/00737 | 1/2002 |
| WO | WO 02/05116 | 1/2002 |
| WO | WO 02/07037 | 1/2002 |
| WO | WO 02/097676 | 12/2002 |
| WO | WO 03/014928 | 2/2003 |
| WO | WO 03/014928 A2 | 2/2003 |
| WO | WO 03/014929 A1 | 2/2003 |
| WO | WO 03/062983 | 7/2003 |
| WO | WO 03/062983 A2 | 7/2003 |
| WO | WO 03/063450 A1 | 7/2003 |

OTHER PUBLICATIONS 2003 definition of "client" available at: http://www.techweb.com/encyclopedia/printView?term=client&view=print.*

Ravi Kokku et al., "Half-pipe Anchoring: An Efficient Technique for Multiple Connection Handoff," Proceedings 10th International Conference on Network Protocols, Nov. 12, 2002, XP010632563, 10 pages.

Ying-Dar Lin et al., "Direct Web Switch Routing with State Migration, TCP Masquerade, and Cookie Name Rewriting," Globecom 2003, IEEE Global Telecommunications Conference; Dec. 12003, IEEE, CP010677300, pp. 3663-3667.

(56) References Cited

OTHER PUBLICATIONS

International Searching Authority, "Notification of Transmittal of the International Search Report and the Written Opinion of the International Searching Authority, or the Declaration," Nov. 12, 2004, 13 pages.
Current Claims of International Application No. PCT/US2004/026570, 4 pages, no date.
Current Claims of International Application No. PCT/US2004/025805, 8 pages, no date.
International Searching Authority, "Notification of Transmittal of the International Search Report and the Written Opinion of the International Searching Authority, or the Declaration," dated Dec. 3, 2004, 12 pages.
"Distributed Systems, Concepts and Design", by Coulouris et al., 1994, Adison-Wesley.
"Workload Balancing in a Distributed Environment", IBM Technical Disclosure Bulletin, Nov. 1995.
"Local Area Network Server Replacement Procedure" IBM Technical Disclosure Bulletin, Jan. 1995.
Renu Tewari, et al., "Highly Availability in Clustered Multimedia Servers", (IEEE), Mar. 1996, pp. 645-654.
Current Claims in PCT application, International Application No. PCT/US03/23747, 13 pages, no date.
International Searching Authority, "Notification of Transmittal of the International Search Report or the Declaration," dated May 25, 2004, 6 pages.
Kei Kurakawa et al., "Life Cycle Design Support Based on Environmental Information Sharing," IEEE, Feb. 1-3, 1999, Proceedings EcoDesign '99, First International Symposium, pp. 138-142.
Oliver Gunther, et al., "MMM: A Web-Based System for Sharing Statistical Computing Modules," IEEE, May-Jun. 1997, vol. 1, Issue 3, pp. 59-68.
"CODA: A Highly Available File System for a Distributed Workstation Environment", Mahadev Satyanarayanan, IEEE Transactions on Computers, vol. 39, No. 4, pp. 447-459, Apr. 1990.
"Scalable, Secure, and Highly Available Distributed File Access", Mahadev Satyanarayanan, IEEE Transactions on Computers, vol. 23 5, pp. 9-21, May 1990.
International Preliminary Examining Authority, "Written Opinion of the International Preliminary Examining Authority," Jun. 7, 2005, 4 pages.
Current Claims of International Application No. PCT/US04/26570, 4 pages, no date.
International Searching Authority, "Notification of Transmittal of the International Search Report and the Written Opinion of the International Searching Authority, or the Declaration," Aug. 4, 2005, 13 pages.
Current Claims for International Application No. PCT/US2004/026389, pp. 1-7, no date.
Jeffrey S. Chase et al., "Dynamic Virtual Clusters in a Grid Site Manager," Proceedings of the $12^{12}$ IEEE International Symposium on High Performance Distributed Computing (HPDC'03), 2003, IEEE, pp. 90-100.

European Patent Office, "International Preliminary Report on Patentability," Aug. 26, 2005, International Application No. PCT/US2004/026570, 9 pages.
International Searching Authority, "Notification of Transmittal of the International Search Report and the Written Opinion of the International Searching Authority, or the Declaration," Aug. 25, 2005, 12 pages.
Current Claims for International Application No. PCT/US2004/026445, pp. 1-5, no date.
Henry Song, et al., "Browser State Repository Service," Lecture Notes in Computer Science, vol. 2414, 2002, pp. 1-14, XP002904339.
Eric Skow, et al., "A Security Architecture for Application Session Handoff," 2002, IEEE International Conference Proceedings, Apr. 28-May 2, 2002, vol. 1 of 5, pp. 2058-2063, XP010589848.
International Searching Authority, "Notification of Transmittal of the International Preliminary Report on Patentability," PCT/US2004/026445, dated Dec. 12, 2005, 6 pages.
Claims as Amended, PCT/US2004/026445, Aug. 11, 2005, 4 pages (attached).
Patent Cooperation Treaty, "Notification of Transmittal of the International Preliminary Report on Patentability," PCT/US2004/026405, dated Oct. 10, 2006, 7 pages.
Amended Claims, PCT/US2004/026405, dated Apr. 6, 2006, 4 pages (attached).
European Patent Office, "Communication Pursuant to Article 96(2) EPC," App. No. 04781256.3 (50277-2985), dated Feb. 2, 2007, 4 pages.
Claims, App. No. 04781256.3 (50277-2985), pp. 34-36, Feb. 10, 2006.
Kokku, Ravi et al., "Half-Pipe Anchoring: An Efficient Technique for Multiple Connection Handoff," Proceedings of the $10^{th}$ International Conference of Network Protocols, Nov. 12, 2002, 10 pages.
"Office Action" received in related case U.S. Appl. No. 10/917,661 filed Aug. 12, 2004, 9 pages.
"Office Action" received in related case U.S. Appl. No. 10/918,056 filed Aug. 12, 2004, 9 pages.
"Office Action" received in related case U.S. Appl. No. 10/917,687 filed Aug. 12, 2004, 9 pages.
"Notice of Allowance and Fee Due" received in U.S. Appl. No. 10/917,843 received on Apr. 1, 2008 (7 pages).
European Patent Office, "Communication under Rule 71(3) EPC", Application No. 04781286.2-1244, dated Sep. 11, 2008, 6 pages.
Claims, Application No. 04781286.2-1244, dated Sep. 11, 2008, 40 pages.
Jeffrey S. Chase et al., "Dynamic Virtual Clusters In A Grid Site Manager", Jun. 22, 2003, 11 pages.
Japanese Patent Office, "Final Decision for Rejection (English translation)", patent application No. 523426/2006, dated Aug. 31, 2010, 2 pages.

\* cited by examiner

SUSPENDING AND RESUMING OF SESSIONS

RELATED APPLICATIONS

The present application is related to the following patent applications: U.S. application Ser. No. 10/917,953, Transparent Session Migration Across Servers, filed by Sanjay Kaluskar, et al. on the Aug. 12, 2004 and incorporated herein by reference; U.S. application Ser. No. 10/917,843, Extensible Framework for Transferring Session State, filed by Sanjay Kaluskar, et al. on the Aug. 12, 2004 and incorporated herein by reference; U.S. application Ser. No. 10/917,882, Transparent Migration of Stateless Sessions Across Servers, filed by Sanjay Kaluskar, et al. on the Aug. 12, 2004 and incorporated herein by reference.

FIELD OF THE INVENTION

The present invention relates to capturing and restoring session state to perform such tasks as transferring sessions between servers to balance work load in a multi-node computer system.

BACKGROUND OF THE INVENTION

Many enterprise data processing systems rely on multi-node database servers to store and manage data. Such enterprise data processing systems typically follow a multi-tier model that has a multi-node database server in the first tier, and one or more computers in the middle tier and outer tiers.

Figure 1:
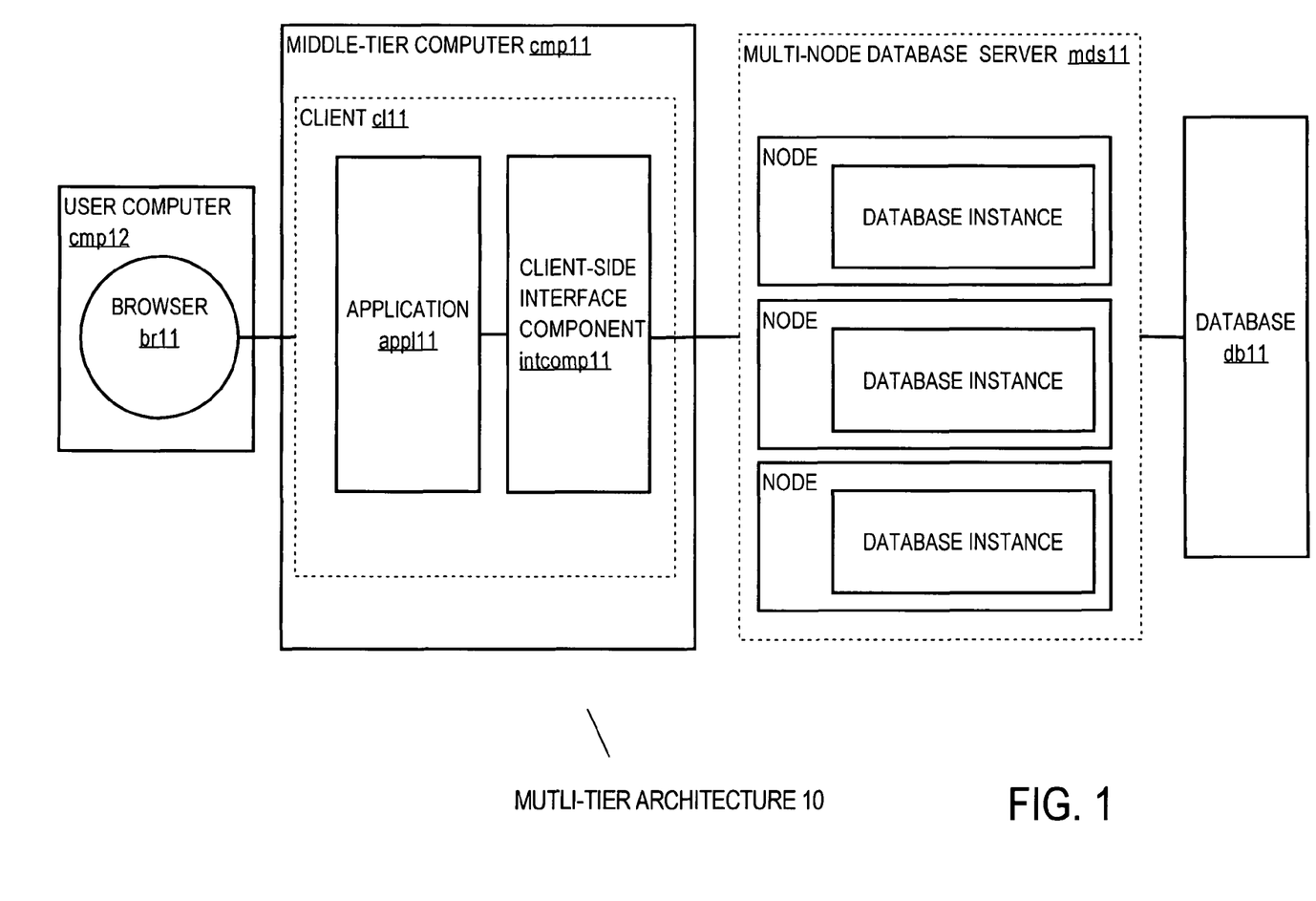
FIG. 1 is a block diagram of a multi-tier architecture for a computer system

FIG. 1 depicts multi-node database server mds11, which is implemented on multi-tier architecture 10. A server, such as multi-node database server mds11, is a combination of integrated software components and an allocation of computational resources, such as memory, a node, and processes on the node for executing the integrated software components on a processor, the combination of the software and computational resources being dedicated to performing a particular function on behalf of one or more clients. Resources from multiple nodes in a multi-node computer system can be allocated to run a particular server's software. A particular combination of the software on a node and the allocation of the resources from the node is a server that is referred to herein as a server instance or instance. Thus, a multi-node server comprises multiple server instances that can run on multiple nodes. Several instances of a multi-node server can even run on the same node.

A database server governs and facilitates access to a particular database, processing requests by clients to access the database. A multi-node database server, such as multi-node database server mds11, comprises multiple "database instances", each database instance running on a node. Multi-node database server mds11 governs access to database db11. A multi-node database server can govern and facilitate access to one or more databases.

The middle-tier of multi-tier architecture 10 includes middle-tier computer cmp11 and the outer-tier includes user computer cmp12. User computer cmp12 executes browser br11, which interacts with an end-user. The end-user's interaction with browser br11 causes the browser to transmit requests over a network, such as the Internet, to middle-tier computer cmp11. The request causes a process client cl11 on middle-tier computer cmp11 to execute application appl11. Execution of application appl11 by the client cl11 causes client cl11 to connect to multi-node database server mds11. For example, application appl11 may be an order entry application that is configured to receive order requests from browser br11. Data for the order entry application is stored in db11. To process the requests, execution of application appl11 by client cl11 causes client cl11 to connect to database db11. Once connected, client cl11 issues database statements to retrieve and manipulate data stored in database db11.

The tier that directly connects to a server, relative to other tiers in a multi-tier architecture, is referred to herein as containing the client of the server. Thus, client process cl11 is referred to herein as the client of multi-node database server mds11.

An application, as the term is used herein, is a unit of software that is configured to interact with and use the functions of a server. In general, applications are comprised of integrated functions and software modules (e.g. programs comprised of machine executable code or interpretable code, dynamically linked libraries) that perform a set of related functions.

An application, such application appl11, interacts with a multi-node database server mds11 via client-side interface component intcomp11. Execution of application appl11 by client cl11 causes client cl11 to execute client-side interface component intcomp11 to interact with multi-node database server mds11. Application appl11 includes invocations of routines (e.g. functions, procedures, object methods, remote procedures) of client-side interface component intcomp11. Applications are typically developed by vendors and development teams different from those that develop servers and interfaces to servers, such as multi-node database server mds11 and client-side interface component intcomp11.

In order for a client to interact with multi-node database server mds11, a session is established for the client on a database instance of multi-node database server mds11. A session, such as a database session, is a particular connection established for a client to a server, such as a database instance, through which the client issues a series of requests (e.g., requests for execution of database statements).

For each database session established on a database instance, session state is maintained for the session. Session state includes the data stored for a database session for the duration of the database session. Such data includes, for example, the identity of the client for which the session is established, and temporary variable values generated by processes and database components executing software within the database session. A database component is a set of software modules that provide specialized and related functions for a database server, and shall be described later in greater detail. An example of a database component is a Java execution engine.

The beginning and end of a session demarcates a unit of work. Often, the beginning of a database session corresponds to an end-user establishing an interactive session with an application via, for example, a browser, and ends when the end-user logs off. Thus, the beginning and ending of the database session depend on application logic and end-user action, and may not be controlled by a server on which the session is established.

Client-Side Interface Components

Client-side interface components, such as client-side interface component intcomp11, are software components that reside and are executed on the same computer of a client of a server, and that are configured to provide an interface between the client and the server. The client-side interface component intcomp11 is configured for performing the detailed operations needed to interface with multi-node database server mds11. For example, an application appl11 invokes a function of client-side interface component intcomp11 to establish a connection to multi-node database server mds11. The client-side interface component then handles the details of a connection on a particular instance of multi-node database server mds11. To make requests of multi-node database server mds11, such as a request for execution of a query, application appl11 is configured to invoke functions of client-side interface component intcomp11, which then transmits a request for the same to the node and database instance on which the session is established.

Client-side interface component intcomp11 may generate and/or access state that is hidden from other software modules, that is, is not or may not be referenced and accessed by other software modules, and in particular, by application appl11. Such state is referred to as being internal or private to client-side interface component intcomp11.

For example, to create a database session on a multi-node database server mds11, application appl11 invokes a routine of client-side interface component intcomp11. The client-side interface component establishes a database session on a particular database instance within multi-node database server mds11, and stores details about the database session within internal data structures or objects. Such data structures and objects define, for example, the session established for an application, and specify such values as a session id that identifies a session on a database instance, the name of the database instance, and a network address and port number for the connection to the database instance.

Such details of the session are not returned to application appl11, nor may application appl11 access the details. Instead, what is provided to application appl11 is an "external identifier" for the session, such as a value that internal data of client-side interface component intcomp11 maps to the session, or a reference to an object generated by client-side interface component intcomp11 to store some details of the session in private attributes of the object that are inaccessible to application appl11. In this way, application appl11 does not "know" of the specific details of the session that has been established for it; however, application appl11 has the information needed to be able to identify to client-side interface component intcomp11 the particular session that has been established for application appl11. Note that a session id that is internal to a client-side interface component relative to an application that uses the interface is referred to herein as an internal session id.

Calls

A call is a request made by a client to a server to execute a task. Typically, a call is made by a process executing an invocation of a routine in a software module. The invocation causes the process to execute the routine (such execution may itself entail calling and executing other routines), and then to return to execute the module to a point at or just beyond the invocation (or some other designated point e.g. exception handler).

A call causes the calling process or remote process to execute the called routine, which may cause calling and execution of other routines. The call terminates when the call returns. Operations, which are carried out as part of execution of a called routine, are referred as being made within the call.

For example, to make a call to multi-node database server mds11, application appl11 makes a call of a function of client-side interface component intcomp11. In response to the invocation, client-side interface component intcomp11 executes the call, which entails client-side interface component intcomp11 modifying and accessing "local" data stored in the memory of client computer cmp12 by client-side interface component intcomp11, and client-side interface component intcomp11 making multiple remote procedure calls to a database instance within multi-node database server mds11, the multiple remote procedure calls including a first remote procedure call and a second remote procedure call. In response to the first remote procedure call, the database instance performs various operations. The modification and access of the local data, the multiple remote procedure calls, and the various operations performed by the database instance, are referred to as being performed within the "application call" made by application appl11. The various operations performed by the database instance while executing the routine invoked by the first remote procedure call (which may entail execution of other routines) are referred to herein as being made within the first remote procedure call, within a client-side call because the first remote procedure call was made by the client-side interface component intcomp11, and within an application call because the remote procedure call was made by client-side interface component intcomp11 while executing a routine called by application appl11. An application call or client-side call may both be referred to herein as a client call.

Sessions Often not in-Use

Sessions are used by applications to execute application calls. Most application actions, which include application calls, are made in response to end-user activity. End-user activity can occur in bursts, resulting in periods of inactivity between the bursts. During these periods of inactivity, the sessions are not being used by the application for which they were established.

Sessions, even sessions not in current use, consume resources of a database server. At a given moment, significant portions of a database server's resources are allocated to sessions that are not currently being used by the application.

It is possible to de-allocate resources allocated to a session by terminating the session. However, session state, being treated as transient state by a database server, is not preserved by the database server after termination of the session. Therefore, a session established for an application cannot be terminated until the application no longer needs the session state. The inability to preserve session state after termination impairs important database server capabilities.

Debugging Capability is Impaired

An important capability is providing information about transient session state for purposes of debugging. When debugging, it is useful to know the session state that exists when a bug occurs or to simulate running the software under the same or similar session state under which the bug occurs. Because session state of a session cannot be preserved, such information is not available to those debugging a bug nor may software be easily run under the same or similar session state.

Often, debugging requires the expertise of a database server vendor's experts or other outside experts. Because session state of a session cannot be preserved, this information cannot be kept for later examination by the experts or even transported to the expert's location where the expert could examine the session state and/or simulate the bug.

Applications and End-Users Unable to Terminate Sessions to Conserve Resources

When a database session is not in use depends largely on client-side behavior, and, in particular, the behavior of applications and end-users. Applications and the end-users may know what sessions are not in use. However, an application and end-user cannot request that such sessions be terminated to conserver resources because the sessions' state may be needed later—there is no capability that allows an application or end-user to request to terminate a session and preserve its state in a way that allows the session to be restored and continued when later needed.

Based on the foregoing, it is clearly desirable to provide approaches to terminate a session on an instance and preserve the session's state in a way that allows the session to be later resumed on the instance or a different instance, particularly in response to a request of an application or end-user to do so.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Approaches for suspending and resuming sessions in a single or multi-node environment are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques that enable a session established for an application to be suspended from an instance and later resumed on the instance or a different instance. When a session is suspended, its state is captured and persistently stored as a session image in a repository, and the session is terminated. Capturing a session's state entails producing a session image, which is a stream of bytes that is a veritable copy of the session state of the session. The copy includes transient values of the session. When the session is resumed, a new session is established on an instance, the session image of the session to resume is retrieved from the repository and restored to the newly established session. Session state may be captured and restored using the extensible framework described in Extensible Framework for Transferring Session State. The extensible framework defines an interface for callback functions that are invoked to determine whether a session state may be suspended, and to capture and restore session state. The session state is captured and stored in a session image in a way that allows the application to use another session, to which the captured session state is restored, as the captured session, as if the captured session were never terminated.

The suspension and resumption of a session may be initiated by an application, which may request the suspension and resumption of a particular session. The application may determine that one or more sessions have been unused and inactive for period of time, and then suspend the sessions to reduce the number of sessions, thereby freeing resources and reducing workload on the servers hosting the sessions. The application may initiate the determination and suspension in response to a request by a server to do reduce the number sessions established for the application on the server.

An application may also initiate suspension and resumption of a session in response to an end-user request to suspend the session. End-users thus have the flexibility to suspend work, and resume it later, potentially on another database system at a different location.

When bugs are encountered, the session may be suspended and resumed at another location for debugging.

Illustrative Computer System

Figure 2:
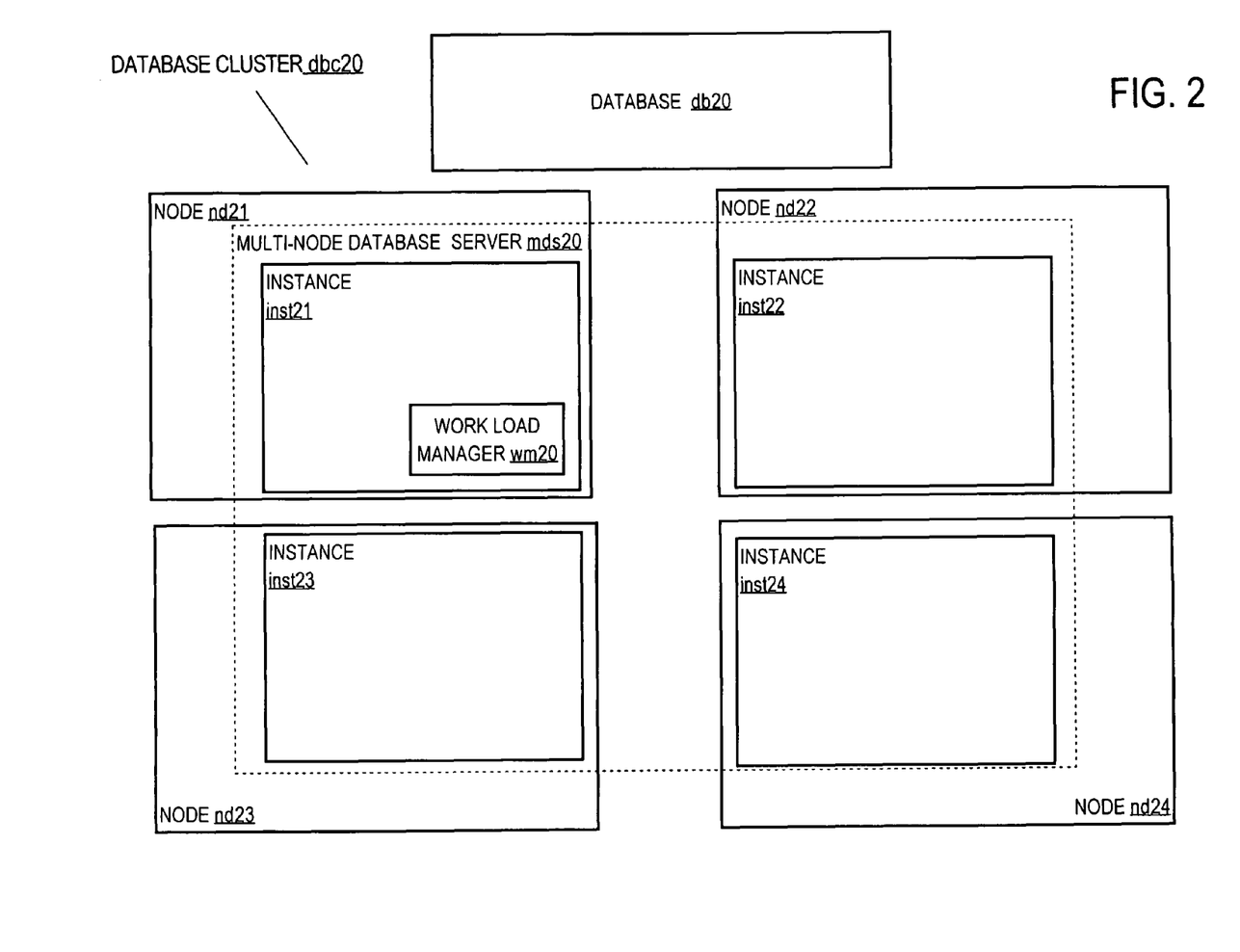
FIG. 2 is a block diagram showing a multi-node computer system on which an embodiment of the present invention may be implemented.

FIG. 2 shows a multi-node computer system that may be used to implement an embodiment of the present invention. Referring to FIG. 2, it shows database cluster dbc20. A database cluster is a set of nodes that host a multi-node database server, such as multi-node database server mds20, that manages access to a particular database. Database cluster dbc20 includes nodes nd21, nd22, nd23, and nd24. The nodes of database cluster dbc20 provide some degree of shared storage (e.g. shared access to a set of disk drives) between the nodes. The nodes in database cluster dbc20 may be in the form of computers (e.g. work stations, personal computers) interconnected via a network, and may be part of a grid. Database server mds20 includes database instances inst21, inst22, inst23, and inst24.

Clients that connect to a database instance that is part of a multi-node database server to access the database managed by the database instance, are referred to herein as clients of the database instance, clients of the multi-node database server, or clients of the database. For example, a process on a computer not part of database cluster dbc20 executes an application and is connected to database instance inst23 to access database db20. The process is referred to as a client of database instance inst23, a client of multi-node database server mds20, and a client of database db20.

Sessions Established for Clients by a Listener

In order for a client to interact with multi-node database server mds20, the client transmits a database connection request to establish a session on a database instance. A listener receives the request. A listener is a process running on database cluster dbc20 that receives requests and directs them to a database instance within database cluster dbc20.

Once the database session is established for the client, the client may issue additional requests, which may be in the form of remote procedure invocations, and which include requests to begin execution of a transaction, to execute queries, to perform updates and other types of transaction operations, to commit or otherwise terminate a transaction, and to terminate a database session.

Illustrative Client and Source and Destination Instance

Figure 3:
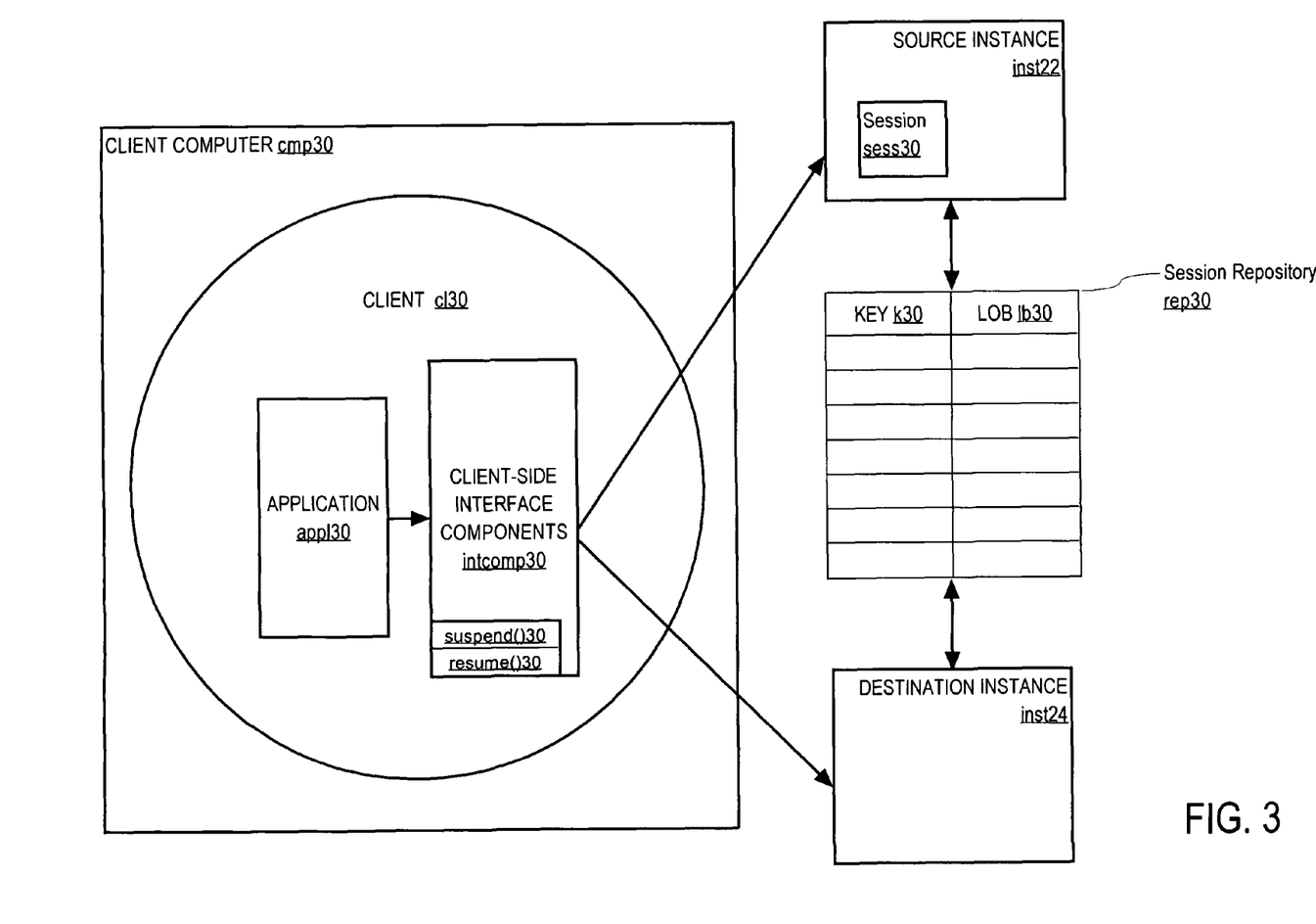
FIG. 3 is a block diagram depicting a client, source database instance, and destination database instance that participate in suspending and resuming a session according to an embodiment of the present invention.

FIG. 3 is a block diagram showing an illustrative client, source instance, and destination instance, used to illustrate suspending and resuming of a session according to an embodiment of the present invention. The source instance is the instance hosting the session to suspend and the destination instance is the instance on which the session is resumed. Referring to FIG. 3, it shows database instance inst22 as source instance inst22 and database instance inst24 as destination instance inst24. While an embodiment of the present invention is illustrated using an example where a session is suspended from one instance and resumed on another within the same multi-node system, an embodiment of the present invention is not so limited. The source instance and destination instance may be the same instance, or the source instance and destination instance may be hosted by different single or multi-node servers.

Client c130 is a process that is running on a client computer cmp30. Client computer cmp30 is a computer that is separate from any node in database cluster dbc20 and that hosts one or more database clients of database cluster dbc20, including client c130. Clients hosted by client computer cmp30 include processes that execute an application, such as application appl30, which is executed by client c130.

Application appl30 interacts with database cluster dbc20 and multi-node database server mds20 via client-side interface component intcomp30. Application appl30 includes invocations of routines (e.g. functions, procedures, object methods, remote procedures) of client-side interface component intcomp30. An example of a client-side interface component is the Oracle Call Interface ("OCI"), available from Oracle Corporation.

Client-side interface component intcomp30 includes functions that may be invoked by application appl30 to suspend and resume a session, such a session sess30. Application appl30 invokes function suspend( )30 to suspend a session. The session to suspend is identified by an input parameter value, such as an external identifier of the session. The function returns a value indicating whether or not the session was suspended. If the session was suspended, then the return value includes a session key. A session key identifies a session that was suspended.

To resume a suspended session, application appl30 invokes function resume( )30, passing as an input parameter the session key identifying the session. Resume( )30 returns a value indicating whether or not the session was resumed.

For purposes of exposition, software modules, such as application appl30, are described herein as performing particular actions, when in fact execution of the software by a process causes the process to perform those actions. For example, when an application appl30 is described as transmitting or receiving a message or accessing data, a process executing the application software is transmitting or receiving the message or accessing the data.

Session repository rep30 is a data repository for storing session images. A data repository is a storage mechanism that may be used to persistently store data, and in particular, session images. According to an embodiment of the present invention, session repository rep30 is a database table, where each row of the table holds the session image of a suspended session. Session repository rep30 includes two columns. Column key k30 holds session keys and large binary object column LOB lb30 stores session images. Each row in session repository rep30 holds a session key and a session image, thereby associating a session image with the session key that identifies the session image.

Collection Criteria, Capture and Restoration of Session State

At a given moment for a database session, future application calls may depend on session state generated by prior application calls. Because of the potential dependency of future applications calls upon session state, suspending and resuming database sessions entails determining whether portions of a session's state may be captured and restored to another session, possibly on a different database instance.

In an embodiment, to determine whether portions of a session's state may be captured and restored to another session, a determination is made about whether session collection criteria are satisfied. Collection criteria are criteria that are used to determine whether session state may be terminated and restored later to another session, possibly on a different instance. Collection criteria can be identical or similar to migration criteria described in Extensible Framework for Transferring Session State, which are criteria used to determine whether a session may be transferred to another database instance. Determining whether collection criteria are satisfied includes determining whether a database session is at a transaction boundary, is at a call boundary, or is at a component boundary.

A database session is at a transaction boundary if there are currently no active transactions being executed for the session. A transaction is a logical unit of work that is performed as an atomic unit. In the context of database systems, the database must reflect all the changes made by a transaction, or none of the changes made by the transaction to ensure the integrity of the database. Consequently, none of the changes made by a transaction are permanently applied to a database until the transaction has been fully executed. A transaction is said to "commit" when the changes made by the transaction are made permanent. A transaction is active if the transaction has not been committed, aborted, or otherwise terminated.

A session is at a call boundary if a database instance has finished executing a client call rather than being at an intermediate stage of processing the call. For example, to process a call to execute a database statement, a database instance goes through stages, each stage corresponding to a particular type of operation. The stages are (1) creating a cursor, (2) parsing the database statement and binding its variables, (3) executing the database statement, (4) fetching the rows to return for the query, and (5) closing the cursor. These stages are described in greater detail in *Oracle8 Server Concepts*, Release 8.0, Volume 3 (the contents of which incorporated herein by reference), at chapter 23. Intermediate stages are the operations performed before processing of the call is complete. The intermediate stages are stages (1)-(5). After an instance performs step (5) in response to a call, a source session is at a call boundary.

A session is at a component boundary if each "database component" of a session is at its respective component boundary. A database component is a set of software modules on a database server that provide specialized and related functions. A database component executed during a session may generate and use a portion of the session state, referred to herein as component session state. According to an embodiment, session state can be viewed as a union or combination of component session states. Database components are described in further detail in Extensible Framework for Transferring Session State.

The following are examples of database components. A cursor component manages cursors within a database instance. A cursor is an area of memory used to store information about a parsed database statement and other information related to the processing of the database statement. A PL/SQL component is a database component responsible for executing code (e.g. procedures) written in PL/SQL, a procedural database language promulgated by Oracle Corporation. Session parameters component is a database component responsible for managing attributes that generally control how calls and requests associated with a session are processed. The attributes are stored in a component session state. For example, session parameters can include an attribute that controls the particular human language for results returned by executing queries. A Java component is a database component that is responsible for executing code (e.g. class and object methods) written in Java. The Java component uses component session state to store information related to the execution of Java code.

A database session is at a component boundary for a particular database component if the component session state of the database component can be captured and restored to another session. A database component provides a function that returns a value indicating whether or not the database component's respective component session state may be captured and restored to another session. A reason component session state of a database session may not be captured and restored is that component session state includes a file descriptor of an open file. The file descriptor contains information that is only valid for an instance hosting the database session for a period of time.

The function is part of an interface of callback functions supported by each database component. The functions are invoked to capture and restore component session state, as well as to determine whether a component session state permits a session to be captured and restored.

Suspend Session Protocol

Figure 4:
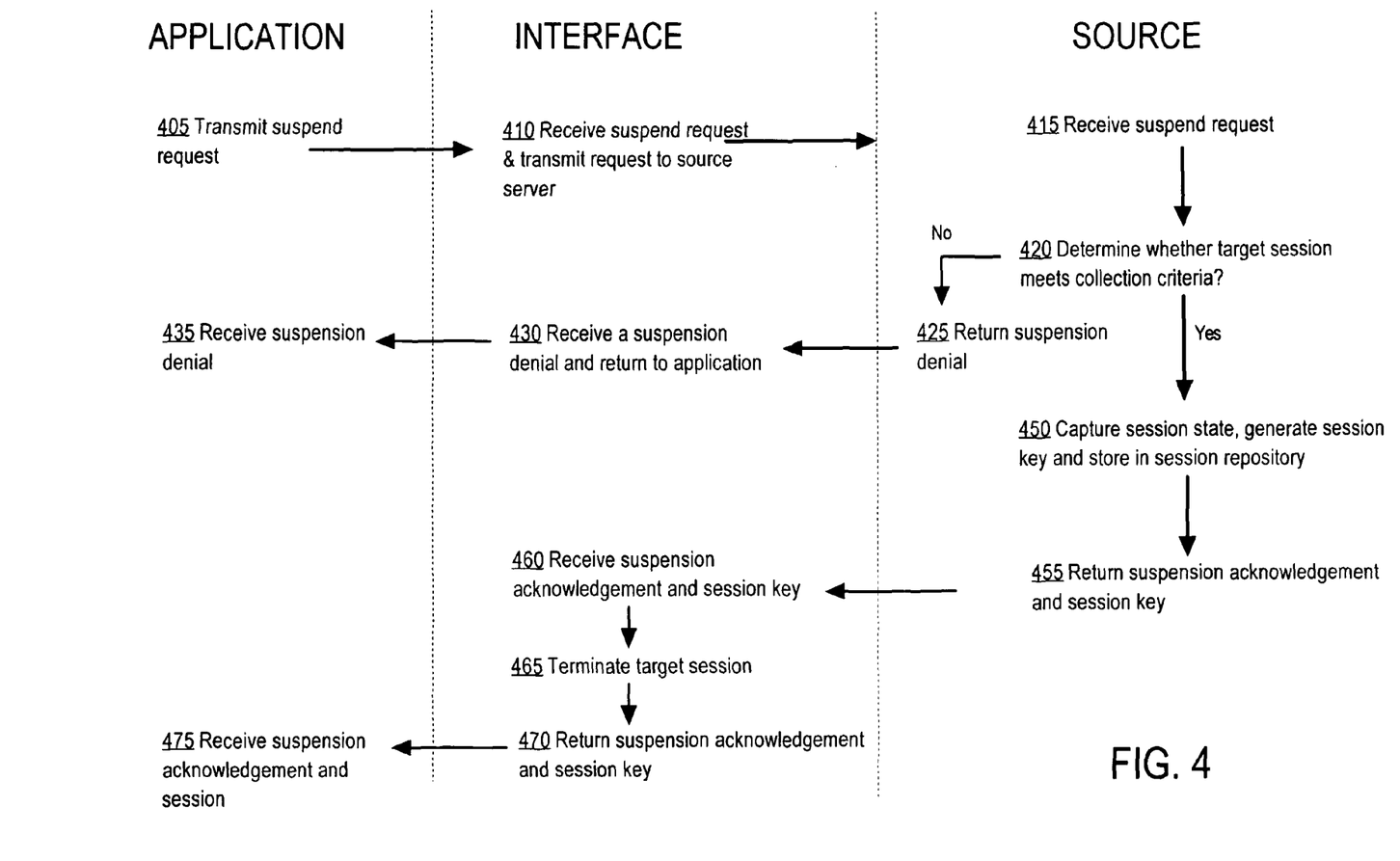
FIG. 4 is an entity-interaction diagram showing a protocol for suspending a session according to an embodiment of the present invention.

FIG. 4 is an entity-interaction diagram used to illustrate a protocol for suspending a session. The protocol is illustrated using appl30, client-side interface component intcomp30, and source instance inst22, as participants in the protocol.

Referring to FIG. 4, application appl30 initiates the protocol, at step 405, by transmitting a suspend request to suspend a "target session". The request is transmitted by invoking function suspend( )30, passing in the external identifier that identifies the target session.

At step 410, client-side interface component intcomp30 receives the suspend request from application appl30. Client-side interface component intcomp30 determines the session id of the target session and instance that hosts the session, which is source instance 142. Client-side interface component intcomp30 then transmits a suspend request to source instance inst22, which includes the session id. At step 415, source instance inst22 receives the suspend request transmitted by client-side interface component intcomp30.

At step 420, source instance inst22 determines whether the target session meets collection criteria. The determination is made by determining whether the target session is at a transaction boundary, at a call boundary, and at a component boundary, the latter determination being made by invoking functions of database components described earlier.

If the target session does not meet collection criteria, then at step 425, source instance inst22 returns a suspension denial to client-side interface component intcomp3. At step 430, client-side interface component intcomp30 receives the suspension denial from source instance inst22 and returns a suspension denial to appl30, which is received by the application appl30 at step 435.

If the target session meets collection criteria, then at step 450, source instance inst22 captures the session state of the target session and generates a session image, generates a session key, and stores the session image and session key in a row of session repository rep30 along with the session key.

At step 455, source instance inst22 returns a suspension acknowledgement along with a session key to client-side interface component intcomp30.

At step 460, client-side interface component intcomp30 receives the suspension acknowledgement and session key. At step 465, client-side interface component intcomp30 terminates the target session on source instance inst22. Termination of the target session may entail client-side interface component intcomp30 making one more calls to source instance inst22 to terminate the target session.

At step 470, client-side interface component intcomp30 transmits the suspension acknowledgement and session key to application appl30. At step 475, application appl30 receives the suspension acknowledgement.

Resume Session Protocol

Figure 5:
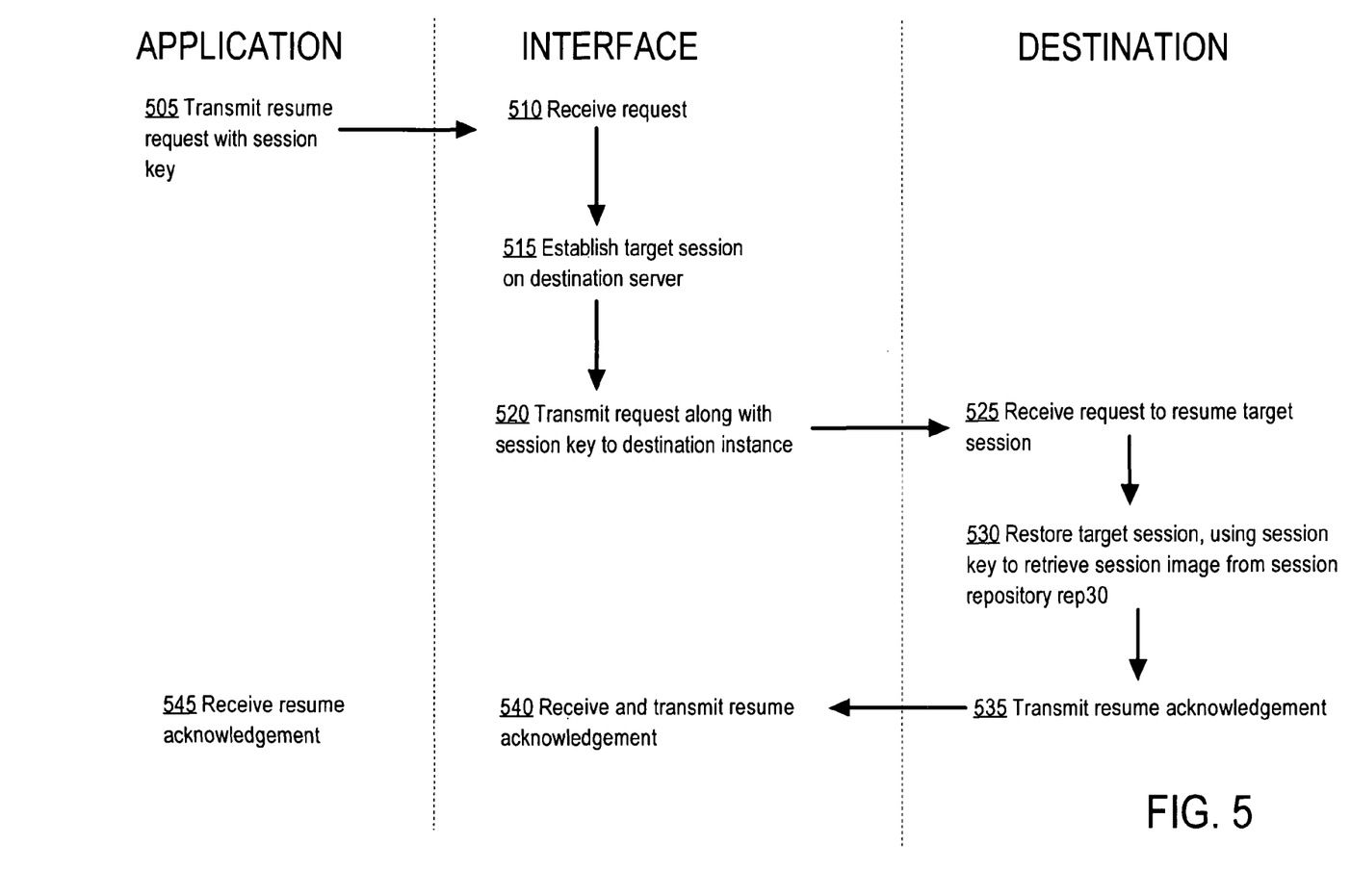
FIG. 5 is an entity-interaction diagram showing a protocol for resuming a session according to an embodiment of the present invention.

FIG. 5 is an entity-interaction diagram used to illustrate a protocol for resuming a session. The protocol is illustrated using appl30, client-side interface component intcomp30, and destination inst24 as participants in the protocol.

Referring to FIG. 5, at step 505, the application transmits to client-side interface component intcomp30 a resume request along with a session key identifying the target session to resume. At step 510, client-side interface component3 receives the request and the session key.

At step 515, client-side interface component intcomp30 establishes a session on destination server int24. Establishing the session entails, for example, making a database connection request to establish a session on destination server int24.

Once the session is established at step 515, at step 520 client-side interface component intcomp30 transmits a request to resume the target session, passing in the session key of the target session to restore.

At step 525, destination server int24 receives the resumption request along with the session key.

At step 530, destination server int24 restores the target session. This action entails retrieving the session state from session repository rep30, and invoking the database components to restore the respective component state within the session established at step 520.

At step 535, destination server int24 transmits a resume acknowledgement to client-side interface component intcomp30. At step 540, client-side interface component intcomp30 receives the resume acknowledgement and transmits a resume acknowledgement to application appl30, which is received by appl30 at step 545.

Hardware Overview

Figure 6:
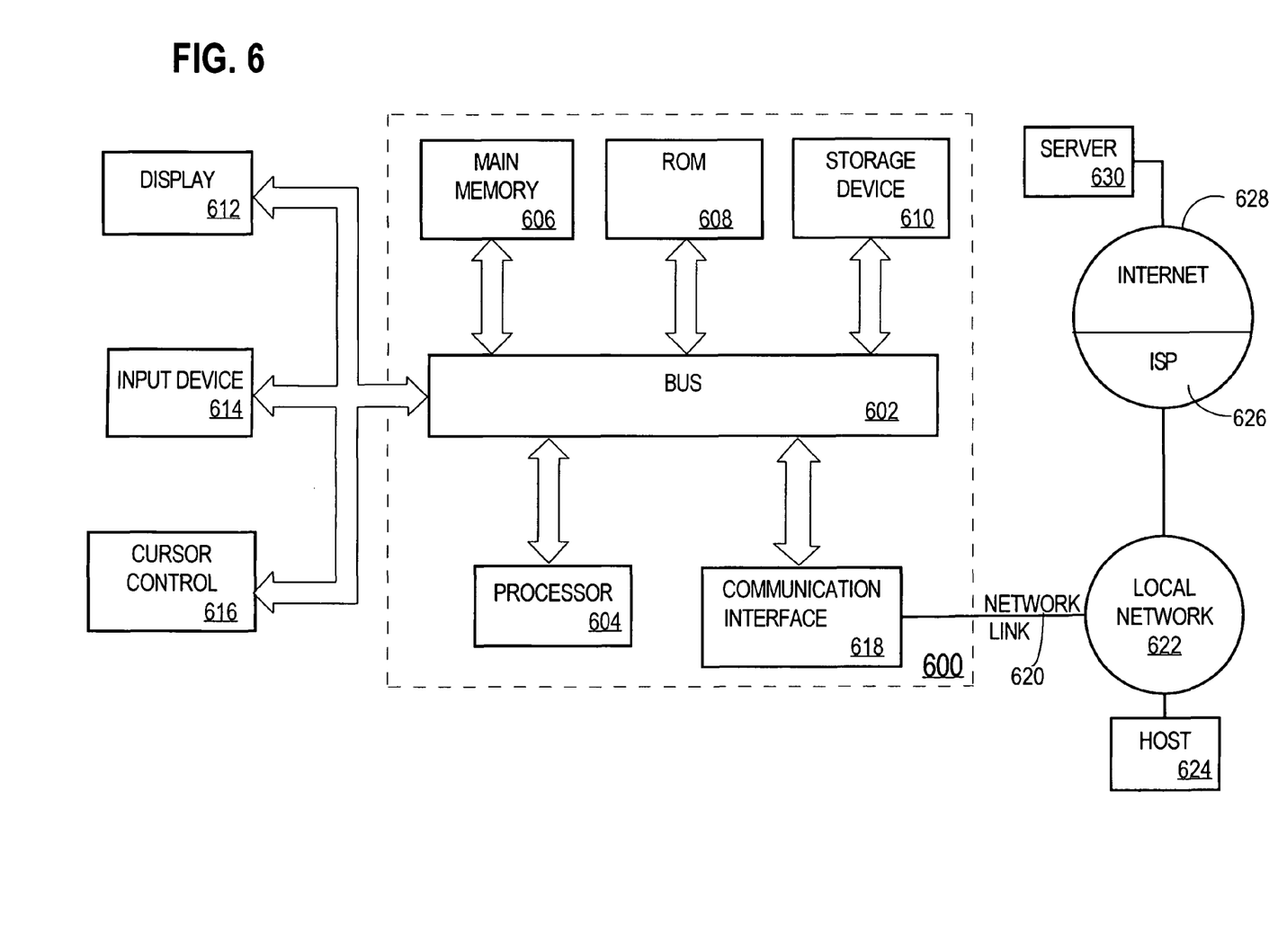
FIG. 6 is a block diagram of a computer system that may be used to implement an embodiment of the present invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

storing, on a node of a multi-node database server that manages a database, session state of a first database session;

wherein the first database session is a connection established for a client to the multi-node database server;

wherein each node of the multi-node database server executes a database instance; wherein the session state is not stored at the client;

while the session state of the first database session is stored on the node of the multi-node database server and before a particular database instance that executes on the node of the multi-node database server terminates the first database session:

determining, by the particular database instance, based on at least a portion of the session state of the first database session, whether one or more collection criteria are satisfied;

only if the one or more collection criteria are satisfied, then:

generating a session image of the session state of the first database session;

storing the session image of the first database session;

terminating the first database session;

after terminating the first database session:

establishing a second database session on a particular node of the multi-node database server;

retrieving the session image; and
using the session image to restore the session state of the first database session to the second database session;
wherein the method is performed by one or more computing devices.

2. The method of claim 1, wherein:
storing the session image includes persistently storing the session image in a session repository; and
retrieving the session image includes retrieving the session image from the session repository.

3. The method of claim 1, wherein establishing the second database session on the particular node includes establishing the second database session on the node.

4. The method of claim 1, wherein said node is a first node of the multi-node database server and said particular node is a second node, of the multi-node database server, that is different than said first node.

5. The method of claim 1, wherein determining whether the one or more collection criteria are satisfied includes determining whether the first database session is at a call boundary, wherein the first database session is at a call boundary if the particular database instance has finished executing a call from the client.

6. The method of claim 1, wherein determining whether the one or more collection criteria are satisfied includes determining whether the first database session is at a transaction boundary, wherein the first database session is at a transaction boundary if no active transactions are currently being executed for the first database session.

7. A method comprising:
establishing, with an application, a first database session on a node of a multi-node database server;
wherein the multi-node database server manages a database;
wherein the first database session includes session state;
wherein the session state is not stored on a device upon which the application executes;
while the session state of the first database session is stored on the node of the multi-node database server, receiving, at a particular database instance that executes on the node of the multi-node database server, from the application, a suspend request identifying the first database session;
in response to receiving said suspend request, the particular database instance:
determining, based on at least a portion of the session state of the first database session, whether one or more collection criteria are satisfied;
terminating the first database session only after determining that the one or more collection criteria are satisfied;
wherein the method is performed by one or more computing devices.

8. The method of claim 7, wherein receiving the suspend request is performed in response to end-user input indicating that the first database session may be suspended.

9. The method of claim 7, wherein the suspend request is received from the application when the application determines to suspend the first database session based at least in part on an amount of time the first database session has been unused by the application.

10. The method of claim 7, wherein determining whether the one or more collection criteria are satisfied includes determining whether the first database session is at a call boundary, wherein the first database session is at a call boundary if the particular database instance has finished executing a call from a client.

11. The method of claim 7, wherein determining whether the one or more collection criteria are satisfied includes determining whether the first database session is at a transaction boundary, wherein the first database session is at a transaction boundary if no active transactions are currently being executed for the first database session.

12. The method of claim 7, further comprising:
prior to terminating the first database session:
generating a session image of the session state of the first database session on the particular database instance,
generating a session key that identifies the session image, and
storing the session image of the first database session in association with the session key;
after terminating the first database session, receiving a resume request to resume the first database session, the resume requesting including the session key; and
in response to receiving the resume request:
establishing a second database session on a computer system,
retrieving the session image using the session key, and
using the session image to restore the session state of the first database session within the second database session.

13. The method of claim 12, further comprising:
sending the session key to the application; and
subsequently receiving the resume request from the application.

14. The method of claim 13, wherein:
storing the session image includes persistently storing the session image in a session repository; and
retrieving includes retrieving the session image from the session repository using the session key.

15. The method of claim 12, wherein said node is a first node of the multi-node database server and said computer system on which the second database session is established is a second node, of the multi-node database server, that is different than said first node.

16. The method of claim 12, wherein the resume request is received from the application.

17. One or more non-transitory storage media storing one or more sequences of instructions which, when executed by one or more processors, cause:
storing, on a node of a multi-node database server that manages a database, session state of a first database session;
wherein the first database session is a connection established for a client to the multi-node database server;
wherein each node of the multi-node database server executes a database instance;
wherein the session state is not stored at the client;
while the session state of the first database session is stored on the node of the multi-node database server and before a particular database instance that executes on the node of the multi-node database server terminates the first database session:
determining, by the particular database instance, based at least a portion of the session state of the first database session, whether one or more collection criteria are satisfied;
only if the one or more collection criteria are satisfied:
generating a session image of the session state of the first database session;
storing the session image of the first database session;
terminating the first database session; after terminating the first database session:

establishing a second database session on a particular node of the multi-node database server;

retrieving the session image; and using the session image to restore the session state of the first database session to the second database session.

18. The one or more storage media of claim 17, wherein:

storing the session image includes persistently storing the session image in a session repository; and retrieving the session image includes retrieving the session image from the session repository.

19. The one or more storage media of claim 17, wherein establishing the second database session on the particular node includes establishing the second database session on said node.

20. The one or more storage media of claim 17, wherein said node is a first node of the multi-node database server and said particular node is a second node, of the multi-node database server, that is different than said first node.

21. The one or more storage media of claim 17, wherein determining whether the one or more collection criteria are satisfied includes determining whether the first database session is at a call boundary, wherein the first database session is at a call boundary if the particular database instance has finished executing a call from the client.

22. The one or more storage media of claim 17, wherein determining whether the one or more collection criteria are satisfied includes determining whether the first database session is at a transaction boundary, wherein the first database session is at a transaction boundary if no active transactions are currently being executed for the first database session.

23. One or more non-transitory storage media storing one or more sequences of instructions which, when executed by one or more processors, cause:

establishing, with an application, a first database session on a node of a multi-node database server;

wherein the multi-node database server manages a database;

wherein the first database session includes session state;

wherein the session state is not stored on a device upon which the application executes;

while the session state of the first database session is stored on the node of the multi-node database server, receiving, at a database instance that executes on the node of the multi-node database server, from the application, a suspend request identifying the first database session;

in response to receiving said suspend request, the database instance:

determining, based on at least a portion of the session state of the first database session, whether one or more collection criteria are satisfied;

terminating the first database session only after determining that the one or more collection criteria are satisfied.

24. The one or more storage media of claim 23, wherein receiving the suspend request is performed in response to end-user input indicating that the first database session may be suspended.

25. The one or more storage media of claim 23, wherein receiving the suspend request is performed in response to the application determining to suspend the first database session based at least in part on an amount of time the first database session has been unused by the application.

26. The one or more storage media of claim 23, wherein determining whether the one or more collection criteria are satisfied includes determining whether the first database session is at a call boundary, wherein the first database session is at a call boundary if the database instance has finished executing a call from a client.

27. The one or more storage media of claim 23, wherein determining whether the one or more collection criteria are satisfied includes determining whether the first database session is at a transaction boundary, wherein the first database session is at a transaction boundary if no active transactions are currently being executed for the first database session.

28. The one or more storage media of claim 23, wherein the instructions, when executed by the one or more processors, further cause:

prior to terminating the first database session:

generating a session image of the session state of the first database session on the database instance, generating a session key that identifies the session image, and storing the session image of the first database session in association with the session key;

after terminating the first database session, receiving a resume request to resume the first database session, the resume requesting including the session key; and in response to receiving the resume request:

establishing a second database session on a computer system, retrieving the session image using the session key, and using the session image to restore the session state of the first database session within the second database session.

29. The one or more storage media of claim 28, wherein the one or more sequences of instructions include instructions which, when executed by the one or more processors, further cause:

sending the session key to the application; and subsequently receiving the resume request from the application.

30. The one or more storage media of claim 29, wherein:

storing the session image includes persistently storing the session image in a session repository; and retrieving the session image includes retrieving the session image from the session repository using the session key.

31. The one or more storage media of claim 28, wherein said node is a first node of the multi-node database server and said computer system on which the second database session is established is a second node, of the multi-node database server, that is different than said first node.

32. The one or more storage media of claim 28, wherein the resume request is received from the application.

* * * * *